Figure 1:
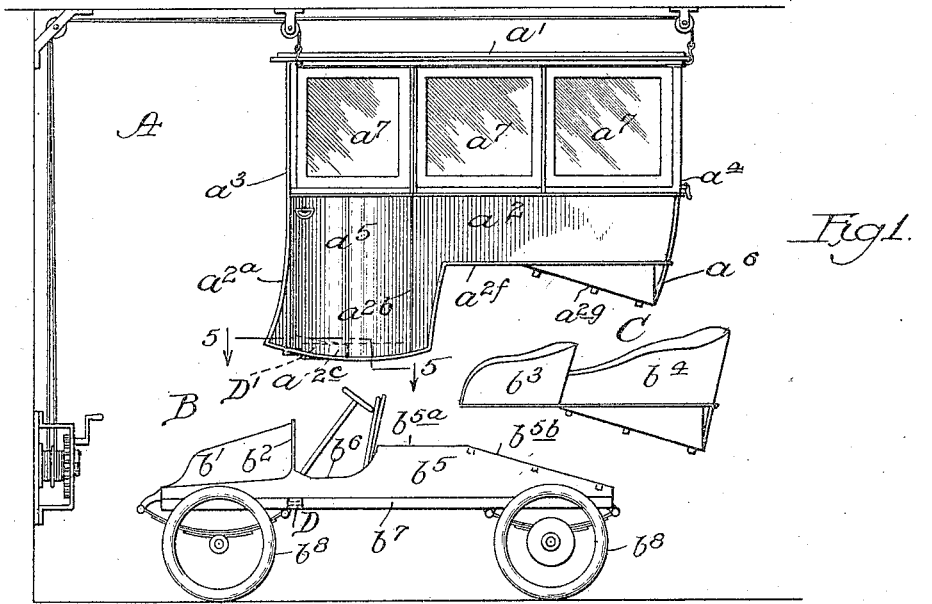

No. 789,961. PATENTED MAY 16, 1905.
H. L. CALL.
DETACHABLE VEHICLE TOP.
APPLICATION FILED OCT. 2, 1903.

Witnesses
Edw Barrett
L. Waldman

Inventor

No. 789,961.

Patented May 16, 1905.

UNITED STATES PATENT OFFICE.

HENRY LAURENS CALL, OF CHICAGO, ILLINOIS.

DETACHABLE VEHICLE-TOP.

SPECIFICATION forming part of Letters Patent No. 789,961, dated May 16, 1905.

Application filed October 2, 1903. Serial No. 175,534.

*To all whom it may concern:*

Be it known that I, HENRY LAURENS CALL, a citizen of the United States, residing at Chicago, in the county of Cook and State of Illinois, have invented a new and useful Improvement and Combination in Detachable Vehicle-Tops, of which the following is a specification.

My invention relates generally to vehicles, and more particularly to means for converting standard open motor-vehicles into closed vehicles of conventional form.

In a pending application for Letters Patent filed by me on April 3, 1903, Serial No. 150,871, a detachable closed top for open-bodied motor-vehicles is illustrated and described as supported above and around the body of an open vehicle by means of a supporting-frame detachably secured to the vehicle beneath the body thereof and upon which the closed top is removably supported and which serves to close the space between the side walls of the top and the body of the vehicle.

In a further pending application for Letters Patent filed by me on August 31, 1903, Serial No. 171,418, an improvement upon foregoing invention is shown and a detachable closed top for open-bodied vehicles is illustrated and described as supported above and around the body of open vehicle by means of lugs or attachments upon the said vehicle and corresponding lugs or attachments upon the said top engaging the said supports upon vehicle and removably secured to the same, the open space between the side walls of the top and the body of vehicle being closed by means of rigid inward extensions upon lower edge and portion of side and rear walls of top and by means of filler-strips of some rigid material detachably secured to the walls of top or to the body of open vehicle and also by means of strips of pliable material secured to the lower edge and inner projections of front, side, and rear walls of top and of the said filler-strips and projecting into contact with the open vehicle-body.

In both said applications the said closed top was shown and described as bottomless and without floor or seats, the walls of same being so constructed as to surround the body of open vehicle and inclose the seats and floor thereof, and thereby and by means of said construction preserving the conventional form and outline, and consequently the character as well, of the particular style of closed top or body chosen and adapted for any given make or style of open-bodied vehicle.

The object of my present invention is to provide a more secure and rigid support for the detachable vehicle-tops shown and described in the foregoing applications and also to secure greater comfort as well as greater elegance in the finish and inner appointments of said detachable tops when fitted to and upon the said open motor-vehicles. For this purpose and to attain these objects I remove the seats and the tonneau of the open-bodied motor-vehicle and provide the detachable top with seats in lieu thereof, resting and supporting the said top upon the framework and part of body of open vehicle upon which the said seats and tonneau rest and are supported before their removal. The side, front, and rear walls of detachable top extend downwardly over and around the body of open vehicle and the said walls of said top surround the body of open vehicle, thus permitting the conventional and artistic lines of the type of closed vehicle-top chosen to be preserved and at the same time adapting the various styles of closed tops to the several types of open motor-vehicles. The side walls of top are also provided with rigid inner extensions at their lower portion to bring the same into proximity and contact with open vehicle-body, thus completing floor of vehicle and closure of same, and strips of pliable material are secured to the lower and inner edges, projections, and extensions of the side walls of top and extend into contact with the open vehicle-body. By means of the said construction, invention, and devices the necessary outward sweep of walls of top to preserve character and outline and to give requisite width and room to the said detachable top is permitted. By means thereof the proper dust-proof and weather-proof connection between said detachable top and said vehicle-body is provided and closure of the completed closed vehicle-body is also made complete and perfect.

My invention will be more fully described hereinafter with reference to the accompanying drawings, in which the same is illustrated as embodied in a convenient and practical form, and in which—

Figure 2:
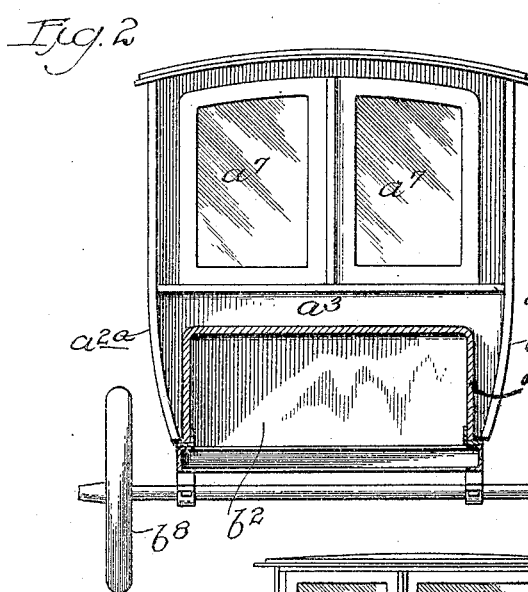
Figure 3:
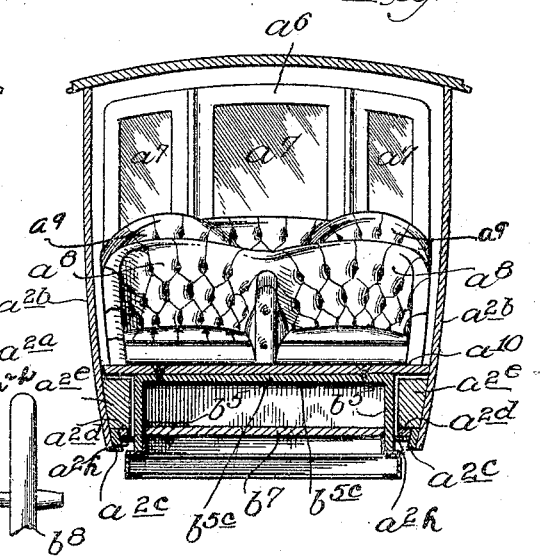
Figure 4:
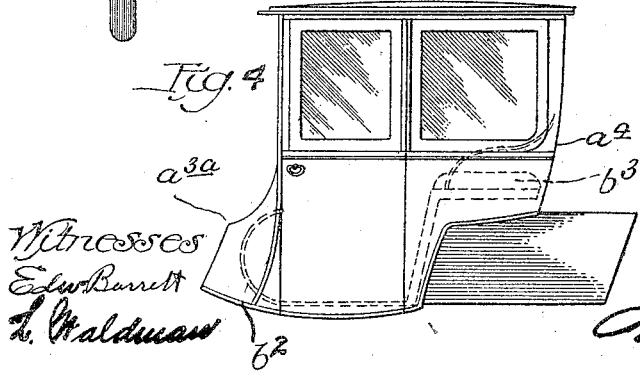
Figure 5:
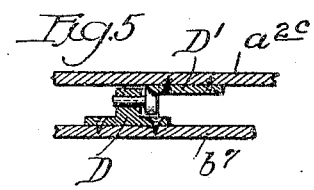

A, Figure 1, is a side elevational view of a rigid closed vehicle-top having an open bottom and comprising top, front, rear, and side walls suspended in position to be placed on vehicle. B, Fig. 1, is a side elevational view of an open-bodied motor-vehicle of the type usually designated as a "touring-car," having detachable rear seats, usually designated as the "tonneau," showing the tonneau and the front or operating seats both removed. C, Fig. 1, is a side elevational view of the said front seats and tonneau after the same have been removed from vehicle. Fig. 2 is a front elevational view of said closed top and of said vehicle, showing the front wall $a^3$ made to conform at bottom to the dash or rear of hood $b^2$ of vehicle and to surround and extend downwardly over the same as the closed top is placed in position thereupon, showing also the said portion of said open vehicle so surrounded and inclosed by said front wall of closed top. Fig. 3 is a cross-sectional view of said closed top and of said open-bodied motor-vehicle with top adjusted upon vehicle viewed from the front immediately forward of front or operating seats, showing the outward sweep and downward extension of the side pillars $a^{2b}$ of said closed top over the side walls and floor of said open-bodied motor-vehicle in order to inclose the same, while at the same time preserving the conventional and artistic outlines and form of said closed top, showing, too, the inner extension $a^{2e}$ of said side pillars of said closed top, as also the inner extension $a^{2d}$, the bottom sill $a^{2c}$ of said closed top at bottom of the side doors thereof in order to inclose the space between the side walls of top and the side and floor of vehicle, and thereby complete the closure of the completed closed vehicle, showing, too, the seats provided in said closed top in lieu of the seats of vehicle which have been removed and the bottom framework of same by means of which said closed top is made to rest upon the body of open vehicle and be secured thereto, showing, moreover, strips of pliable material $a^{2h}$ extending from inner extension $a^{2d}$ of bottom door-sill $a^{2c}$ into contact with sides of vehicle-body $b^5$ to complete the inclosure of vehicle and render same weather and dust proof. Fig. 4 is a side elevational view of a motor-vehicle of the type usually designated as a "runabout," showing the manner in which rear wall $a^4$ of closed top forms inclosure from the rear in vehicles without rear or tonneau seats, showing also forward extension $a^{3a}$ of closed top in order to inclose the dash $b^2$ of open vehicle-body when character of same renders this desirable. Fig. 5 is a sectional detail view looking upward from bottom with top adjusted on vehicle on line 5 5 of Fig. 1, showing one form in which supports and fastening of top is made upon and to vehicle at forward point or portion, said fastening being by means of lug or bracket attached to the inner side of the side wall of detachable top, the same fitting longitudinally in another lug or bracket containing an eye or hole therefor on the outer side of frame $b^7$ (see Fig. 1) of chassis of vehicle.

Similar reference characters designate similar parts in the several figures of the drawings.

A indicates a rigid closed vehicle-top comprising a top wall $a'$, side walls $a^2$, a front wall $a^3$, and a rear wall $a^4$. The side walls are provided with doors $a^5$, the rear wall is provided with door $a^6$, and all of said doors, as also the front, side, and rear walls of said top, are preferably provided with windows $a^7$.

$a^{2a}$ indicates the forward pillar of side walls of top, which form the outer vertical edges and framework of front wall $a^3$ of top.

$a^{2b}$ indicates the main side pillar of side walls of top, just back of the side doors thereof and to which said side doors are hinged.

$a^{2c}$ indicates the bottom sills of side doors of top. $a^{2d}$ indicates the inward extension of said bottom sills of side doors to bring the same into proximity to body of open vehicle, and thereby inclose the space between said sills and the floor and body of open vehicle. $a^{2e}$ indicates the inward extension of pillar $a^{2b}$ for the same purpose. $a^{2f}$ indicates the lower horizontal edge of side walls of top opposite and adjacent to the forward or operating seats of said vehicle and of said detachable closed top, and $a^{2g}$ indicates the lower line or edge of said closed top adjacent to and under the rear seats of said detachable closed top and which rests upon the body of said open vehicle in lieu and in place of the tonneau thereof.

$a^{2h}$ designates strips of pliable material secured to inner extension $a^{2d}$ of side walls of top and projecting into contact with open vehicle sides $b^5$ to complete closure of vehicle.

B indicates open-bodied motor-vehicle of the type usually designated as a "touring-car."

$b'$ indicates the hood or forward extension of vehicle-body; $b^2$, the dash or rear wall of said hood; $b^3$, the forward or operating seats of said vehicle; $b^4$, the rear or tonneau seats of said vehicle; $b^5$, the sides of vehicle-body; $b^6$, the floor of vehicle-body; $b^7$, the framework or chassis of vehicle to which the body is attached, and $b^8$ the wheels of said vehicle. The motor and operating wheels and levers of said vehicle are no part of my invention, are not necessary to illustrate or explain, and are therefore not further described or designated herein.

$b^{5a}$ indicates the line or upper edge of vehicle sides and body upon which the forward seats $b^3$ rest and are supported. $b^{5b}$ indicates the upper edge or line of vehicle sides and body upon which the rear or tonneau seats of said vehicle are detachably supported and rest, and $b^{5c}$ the framework or wall extending across open vehicle-body under forward portion of front seat and upon which same rests and is supported.

In some types of motor-vehicles, notably in the types known and designated as "runabouts," it is desirable for artistic or other reasons to conceal the hood or dash of same under and within the detachable closed top when said top is in position thereupon. For this purpose I have provided a forward and outward extension $a^{3a}$ of the front wall $a^3$ of closed top A, (see Fig. 4,) which surrounds and conceals the hood or dash $b^2$ of motor-vehicle when in position thereupon. In the last-named type of motor-vehicles, moreover, there is of course an absence of the rear or tonneau seats of the vehicle, in which case the rear wall $a^4$ of the closed top extends downwardly in the usual manner to meet the body of open motor-vehicle, forming the back of the forward or remaining seats and inclosing the completed closed vehicle from the rear, the seats of open-bodied vehicle being in this case, as in the case of the touring-car, removed and replaced by seat provided within the closed detachable top and fastening and support of closed top being made by means of the framework of inclosed seat upon the supporting-framework of vehicle-body for the seat of open-bodied vehicle, as aforesaid, removed therefrom for said purpose. (See Fig. 4.)

In order to provide a rigid and firm fastening and support for said detachable closed top A upon said open-bodied vehicle B and at the same time permit the greatest latitude and comfort in the inner arrangement and upholstering of said closed vehicle-top, the tonneau-seats $b^4$ and also the forward seats $b^3$ are first removed from said vehicle, leaving the vehicle in the condition illustrated in Fig. 1. In lieu and in place thereof seats $a^8$ and $a^9$ (see Fig. 3) are provided within said closed top, the forward of said seats $a^8$ being supported upon the bottom line or frame $a^{10}$, (see Fig. 3,) extending across said closed top, along the bottom line or edge $a^{2f}$ (see Fig. 1) of side walls, and in such position as to occupy the place of front seats of vehicle so, as aforesaid, removed when closed top is adjusted upon vehicle. The rear or tonneau seats of closed top are likewise built over and supported upon framework $a^{2g}$, extending downward and backward from said line $a^{2f}$ of side walls of closed top (see Fig. 1) in such direction and position as to rest upon the side and rear walls $b^{5b}$ of said vehicle upon which the removed tonneau seats rest when in position and use upon vehicle. Upon the said framework of seats the detachable closed top and the walls thereof are constructed and supported as the ordinary brougham, hansom, or coach vehicle-body is constructed upon the bottom sill or rockers thereof, and the said walls extend upward and outward and forward therefrom. Adjacent to and immediately forward of the seats $a^8$ and the supporting-frame $a^{10}$ thereof the main or hinge pillars or door-posts $a^{2b}$ of side walls of closed top are placed in the usual position in such vehicle (see Fig. 3) and extend vertically downward over the side walls of open vehicle-body, projecting beyond the same approximately to a point on or below the horizontal level of the floor or bottom of the open vehicle-body. In the same manner the front corner vertical pillars or posts $a^{2a}$ of closed top are placed adjacent and opposite to the dash or rear line of wall of the hood of open-bodied vehicle and extend downwardly over the sides of the same and of the vehicle-body to a point approximately upon a horizontal level with the floor or bottom of open body of vehicle. (See Fig. 2.) At the lower extremity of said side pillars $a^{2a}$ and $a^{2b}$ of detachable closed top and connecting the same the bottom sills $a^{2c}$ of side doors of top are placed and extend horizontally backward from the forward to the rear of said pillars along and outside the side walls of open vehicle-body adjacent to the floor of open vehicle. Inner extensions $a^{2e}$ and $a^{2d}$ (see Fig. 3) are provided to said side pillars $a^{2b}$ and to said bottom door-sill $a^{2c}$, respectively, where the same are necessary to bring the same into proximity to vehicle-body and close space between closed top at said points and the sides of open vehicle-body adjacent thereto. The front wall $a^3$ of closed top (see Fig. 2) is so constructed at the bottom as to fill the space between the front corner-pillars $a^{2a}$ of closed top and the dash or hood of vehicle, thus accomplishing and serving the same purpose at that point as said last-named inner extensions accomplish at the rear of said pillars and said bottom sill of door, or, in case of such open vehicles as it is desirable to cover and conceal the dash or hood of vehicle under and within the closure of detachable top, the forward and outward extension $a^{3a}$ (see Fig. 4) completes the closure of vehicle at said point quite as effectually. Attachment of said closed top to vehicle is made in the same manner as the attachment of tonneau and front seats are made to the open-bodied vehicle, the framework upon which the seats of closed top are formed and which correspond to the like framework under seats and tonneau being fitted with the like screw-holes and attachments into and through which the same can be secured by like means of attachment to the corresponding apertures and attachments as the latter. (See Fig. 2.) Support and attachment of the part of top forward of the seats may be made by means of lugs or attachments D' upon the forward bottom end and portion of closed top and corresponding attachments or supports D upon the frame or body of open vehicle, into and upon which the former rest and are supported. (See Figs. 1 and 5.) The manner and character of this support and fastening may obviously vary indefinitely, and my invention is therefore not limited to any particular form or place of support and fastening.

$a^{2h}$ indicates strips of pliable material secured to lower and inner edges of walls of top, whereby completed closed vehicle is rendered dust and weather proof.

D designates lug or support upon vehicle-frame or chassis; D', the lug or attachment secured to top adapted to fit into and engage the support D, whereby supports and fastening of top is made to vehicle at forward parts.

The manner of using my invention is as follows: When it is desired to convert an open-bodied motor-vehicle into a closed vehicle, the seats $b^3$ and tonneau $b^4$ are first removed from said vehicle, and the said vehicle is placed directly under the closed top, where the same is suspended, as shown and illustrated in Fig. 1 of drawings and in my former applications herein referred to. The detachable closed top is then lowered, by means of the mechanism provided for that purpose, until the framework and lines $a^{2f}$ and $a^{2g}$ of closed top meet and rest upon the corresponding framework and lines $b^{5a}$ and $b^{5b}$ upon open vehicle-body, (see Fig. 1,) and the lugs or attachments provided upon forward end of closed top engage the like or corresponding lugs or attachments provided for that purpose upon the framework or body of open vehicle, after which fastening and attachment of closed top to the vehicle is made, as described in the preceding paragraph of this application.

From the foregoing description it will be observed that I have invented an improvement upon the inventions and combinations shown and described in my former applications for patents, Serial Nos. 150,871 and 171,418, above mentioned and referred to in providing a detachable rigid closed top for open-bodied motor-vehicles to rest directly upon the bodies and framework of the latter in lieu and in place of the seats and tonneaus thereof removed for such purpose, while at the same time the said detachable closed top extends forward from said seats to the hood or dash of open motor-vehicle and incloses the entire space and operating seats and mechanism of said vehicle and the floor thereof and extends downwardly over the sides of open-bodied vehicle adjacent to and opposite to the floor of vehicle and surrounds the floor of said vehicle and the body of said vehicle as well, permitting the form and outline and character of type of closed vehicle-top chosen to be fitted to any given type of open-bodied motor-vehicle to be preserved entire. It will further be observed that by means of the foregoing invention and improvement I am enabled to acquire the utmost rigidity and security of support and fastening for said top upon said vehicle and am further enabled to vary and conform the inner arrangement and upholstering of said top and of completed closed vehicle the more readily to the comfort of the occupants thereof, as well as add to the elegance and conventionality of the vehicle-closure. It will further be observed that by reason and by means of the foregoing inventions, combinations, and improvements I am enabled to combine with the foregoing advantages the preservation and securing of the conventional and artistic form, character, and outlines of the type of closed vehicle-top chosen for any given make or type of open vehicle, and thus secure the beauty of outline appearance and elegance of the completed closed vehicle, as well as the comfort and elegance of the completed closed vehicle and the necessary rigidity and durability of the top and of the completed vehicle as a whole.

I claim—

1. The combination with an open-bodied motor-vehicle, of a rigid closed top, comprising top, front, rear, and side walls, and having an open bottom, provided with seats to replace seats of open vehicle, with its walls surrounding the open vehicle-body, means for detachably supporting said closed top upon said vehicle.

2. The combination with an open-bodied motor-vehicle, of a rigid closed top, comprising top, front, rear and side walls, and having an open bottom, provided with seats to replace seats of open vehicle, with side walls extending downwardly over and outside the open vehicle-body, means for detachably supporting said top upon said vehicle.

3. The combination with an open-bodied motor-vehicle, of a rigid closed top, comprising top, front, rear and side walls, and having an open bottom, provided with seats to replace seats of open vehicle, with its main side and front vertical pillars or posts, also the bottom sills of side doors, extending downwardly over and outside the open vehicle sides and body, means for detachably supporting said top upon said vehicle with its seats resting upon that portion of open vehicle-body and framework from which the seats of open vehicle have been removed.

4. The combination with an open-bodied motor-vehicle, of a rigid closed top, comprising top, front, rear and side walls, and having an open bottom, provided with seats to replace seats of open vehicle, with its main side and front vertical pillars or posts, and bottom sill of side door, and side doors hinged and supported upon same, extending downwardly over and outside of open vehicle sides and body, and with said pillars and sills provided with rigid inward extensions to meet open vehicle-body and form closure of the completed vehicle, means for detachably supporting said top upon said vehicle with its walls surrounding the open vehicle floor and body.

5. The combination with an open-bodied motor-vehicle, of a rigid closed top, comprising top, front, rear and side walls, and having an open bottom, provided with seats to replace seats of open vehicle, and with its front wall and the lower edge and portion thereof provided with a forward and downward extension to surround and cover the dash or hood of open vehicle-body, and conceal or partially conceal the same, means for detachably supporting said top upon said vehicle, with its walls surrounding the open vehicle floor and body.

6. The combination with an open-bodied motor-vehicle, of a rigid closed top, comprising top, front, rear and side walls, and having an open bottom, provided with seats to replace the seats of open vehicle, with its side walls forward of the operating-seats extending downwardly over and outside of the body of open vehicle, provided with inward projections or extensions, to meet and adjoin the open vehicle floor and body, and with the front wall thereof made to conform at bottom to the hood or dash of open vehicle and surround the same, thereby completing the closure of the vehicle, the bottom and inner edges of said walls, and inward extensions thereof having strips of pliable material secured thereto and projecting into contact with vehicle-body, thereby rendering the completed closed vehicle dust and weather proof, means for detachably supporting said top upon said vehicle, with its walls surrounding the floor and body of same.

7. The combination with an open-bodied motor-vehicle, of the type known and designated as a touring-car, of a rigid closed top, comprising top, front, rear and side walls, and having an open bottom, the closure of same extending forward to the hood or dash of vehicle, provided with seats to replace the rear or tonneau-seats of vehicle, means for supporting said top upon said vehicle, with its rear portion and seats resting upon the framework and portion of open vehicle-body from which the tonneau-seats of open-bodied vehicle have been removed, and with its walls surrounding the body of open vehicle.

8. The combination with an open-bodied motor-vehicle of the type usually known and designated as a touring-car, of a rigid closed top, having an open bottom, and comprising top, front, rear, and side walls, the said top, front and side walls, and consequently the closure of said top, extending forward to the dash or hood of said vehicle, and inclosing both the front and rear seats thereof, the said top being provided with both front or operating, and rear or tonneau seats to replace the corresponding seats of said vehicle, means for supporting said top upon said vehicle, with its rear portion and bottom framework under seats resting upon the portion and framework of open vehicle from which seats have been removed, and with its walls surrounding the open vehicle-body, and inclosing floor of same.

9. The combination with an open-bodied motor-vehicle, of the type usually known and designated as a touring-car, of a rigid closed top, comprising top, front, rear and side walls, having an open bottom, and being provided with seats to replace seats of open vehicle, the top and side walls of said closed top extending forward to the hood or dash of vehicle, and the front wall adjoining and surrounding the said dash or hood of vehicle, the side walls moreover extending downwardly over the sides of vehicle-body adjacent to floor of same, means for supporting said top upon said vehicle, with its rear portion and bottom framework under seats resting upon the portion and framework of open vehicle from which seats have been removed, and with its walls surrounding the open vehicle-body and inclosing floor of same.

10. The combination with an open-bodied motor-vehicle of the type usually known and designated as a touring-car, of a rigid closed top, comprising top, front, rear, and side walls, having an open bottom, and being provided with seats to replace seats of open vehicle, the said top and closure of same extending forward to the dash or hood of vehicle, and backward to the rear of open vehicle-body, and being provided with side doors for entrance to the front or operating seats, and with rear door for entrance to the rear or tonneau seats of vehicle, means for detachably supporting said top upon said vehicle with its rear portion and bottom framework under its said seats, resting upon the portion and framework of open vehicle-body, from which seats have been removed, and with its walls surrounding open vehicle-body and inclosing floor of same.

11. The combination with an open motor-vehicle, of the type usually known and designated as a touring-car, of a rigid closed top, comprising top, front, rear and side walls, having an open bottom, and being provided with seats to replace seats of open vehicle, the said top and closure of same extending from the rear of open vehicle-body forward to the dash or hood of same, and being provided with side doors or entrance to the front or operating seats of vehicle, and with rear door for entrance to the rear or tonneau seats thereof, the said doors and the hinge-and-lock pillars and bottom sills thereof, extending downwardly over the sides and rear walls of open vehicle-body, in such manner as to surround and inclose the open vehicle floor and body and portions of the same, means for supporting said top upon said vehicle, with its rear portion and bottom framework under seats, resting upon the portion and framework of open vehicle from which the seats thereof have been removed, and with its walls inclosing the floor of open vehicle-body.

12. The combination with an open-bodied motor-vehicle of the type usually known and designated as a touring-car, of a rigid closed top, comprising top, front, rear and side walls, having an open bottom and provided with seats to replace the seats of open vehicles, removed for that purpose, the said closed top extending from the rear of said open vehicle-body forward to the dash or hood of same, the side and rear walls of said closed top extending downwardly over and outside the open vehicle floor and body, and being provided with rigid inward extensions along the bottom edge and portion thereof, projecting into proximity with the open vehicle-body in order to diminish open space between the said top and the sides and floor of vehicle, and thus make closure of completed vehicle, the lower edges and inner extensions of the walls of said top, being furthermore provided, where the same meet and adjoin the open vehicle-body, with strips of pliable material, secured thereto, and projecting into contact with the open vehicle-body, in order to render the same completely dust and weather proof, means for removably supporting said top upon said vehicle, substantially as shown.

HENRY LAURENS CALL.

Witnesses:
S. J. LOCOSHASKI,
F. J. ELSNER.